US012784101B2

(12) United States Patent
Cohen

(10) Patent No.: US 12,784,101 B2
(45) Date of Patent: Nov. 3, 2026

(54) PROCESS AND GRAPHICAL USER INTERFACE FOR MATCHING AND EXECUTING AGAINST ORDER IMBALANCE FLOW FROM AUCTIONS/CROSSES

(71) Applicant: Cargotts Consulting LLC, New York, NY (US)

(72) Inventor: Jeremy Cohen, New York, NY (US)

(73) Assignee: Cargotts Consulting LLC, New York, NY (US)

( * ) Notice: Subject to any disclaimer, the term of this patent is extended or adjusted under 35 U.S.C. 154(b) by 24 days.

(21) Appl. No.: 18/951,115

(22) Filed: Nov. 18, 2024

(65) Prior Publication Data

US 2026/0141445 A1 May 21, 2026

(51) Int. Cl.
*G06Q 40/04* (2012.01)
*G06Q 30/08* (2012.01)

(52) U.S. Cl.
CPC ............. *G06Q 40/04* (2013.01); *G06Q 30/08* (2013.01)

(58) Field of Classification Search
CPC ............................... G06Q 40/04; G06Q 30/08
See application file for complete search history.

(56) References Cited

U.S. PATENT DOCUMENTS

| | | | | |
|---|---|---|---|---|
| 2003/0065608 A1* | 4/2003 | Cutler | G06Q 40/06 | 705/37 |
| 2007/0005481 A1* | 1/2007 | Kedia | G06Q 40/04 | 705/37 |
| 2014/0129404 A1* | 5/2014 | White | G06Q 40/06 | 705/37 |
| 2021/0383470 A1* | 12/2021 | Blaugrund | G06Q 40/04 | |

FOREIGN PATENT DOCUMENTS

| | | | |
|---|---|---|---|
| CA | 2544673 A1 * | 10/2007 | G06Q 30/06 |
| GB | 2476677 A * | 7/2011 | G06Q 40/04 |
| WO | WO-2005104760 A2 * | 11/2005 | G06Q 40/04 |

* cited by examiner

*Primary Examiner* — Asha Puttaiah
(74) *Attorney, Agent, or Firm* — DLA Piper LLP (US)

(57) ABSTRACT

An imbalance data integration and distribution ("DID") system configured to receive order data associated with one or more equity securities from one or more trading systems and imbalance data associated with all equity securities listed on a respective exchange of the one or more national securities exchanges. The imbalance DID system may continuously compare the order data and the imbalance data. The imbalance DID system may generate a presentation package including the order data of the security and the imbalance data of the security and an interactive presentation. The interactive presentation may be displayed on a graphical user interface ("GUI") of one or more user devices. Upon receiving user input to the interactive presentation, the imbalance DID system may send an order, after having matched order data and imbalance data, to an exchange for execution.

42 Claims, 8 Drawing Sheets

PROCESS AND GRAPHICAL USER INTERFACE FOR MATCHING AND EXECUTING AGAINST ORDER IMBALANCE FLOW FROM AUCTIONS/CROSSES

TECHNICAL FIELD

The present disclosure generally relates to auctions and crosses by national securities exchanges including, but not limited to, "openings" and "closings" that are accompanied by a formal dissemination of imbalance data at predetermined times and intervals as set by the exchanges, and in particular to systems, methods, and non-transitory computer readable medium directed to an improved process and graphical user interface ("GUI") for monitoring the imbalance data (e.g., for multiple equity securities at the same time), enabling traders to match open buy and sell equity orders with share imbalances.

BACKGROUND

Many national securities exchanges, including the two largest by trading volume, the New York Stock Exchange (NYSE™) and the National Association of Securities Dealers Automated Quotations (NASDAQ™) Stock Exchange, operate two or more formal auctions and/or crosses each trading day. For example, the two primary auctions on the NYSE™ are the "opening auction" and the "closing auction." On the NASDAQ™, the two primary crosses are the "opening cross" and the "closing cross." On both exchanges, the openings occur at a set time (e.g., 9:30 a.m. EST) and the closings occur at a set time (e.g., 4:00 μm. EST).

The NYSE™ closing auction is the busiest time in the US equity market trading day, marking the largest liquidity event of the day. Typically, over 10% of NYSE™-listed daily trading volume trades in the closing auction, which amounts to between 200 and 300 million shares trading in the NYSE™ closing auction each day. Similarly, almost 10% of NASDAQ™ listed daily trading volume typically trades in the NASDAQ™ Closing Cross, marking the NASDAQ™ exchange's busiest time. The NYSE™ Closing Auction and the NASDAQ™ Closing Cross (as well as other closing auctions and crosses on smaller national, primary exchanges) are important since they are the last trade of the day during normal trading hours on their respective exchanges and they are designed to determine the closing price for each listed stock. In addition, the closing auctions and crosses offer a unique time for institutional traders to find and interact with centralized liquidity, as all buyers and sellers come together at one market center and establish one clearing price for all interest. Opening auctions and opening crosses also play a significant role because they not only establish an official "opening price" for individual equity securities on the primary exchanges unto which they are listed, but they too establish a time when institutional traders can find and interact with large amounts of centralized liquidity.

SUMMARY

Aspects of the present disclosure relate to methods, systems, and computer-readable media for monitoring imbalance data for multiple equity securities and matching open buy and sell equity orders with imbalance data that is disseminated by one or more exchanges at predetermined times and intervals. A data interface of an imbalance data integration and distribution ("DID") system may receive order data associated with orders for a plurality of equity securities from one or more trading systems via a network. The data interface may retrieve imbalance data associated with one or more of an auction and a cross from one or more national securities exchanges, the imbalance data associated with the equity securities listed on a respective exchange of the one or more exchanges. The data interface may store the order data and the imbalance data in one or more data caches. A gateway server of the imbalance DID system may retrieve the order data and a portion of the imbalance data associated with the plurality of equity securities from the one or more data caches. The gateway server may continuously compare the order data and the portion of the imbalance data. The gateway server may generate a presentation package comprising order data associated with orders for one or more equity securities of the plurality of equity securities and the imbalance data associated with the one or more equity securities. An interactive graphical user interface ("GUI") of the imbalance DID system may generate an interactive presentation based on the presentation package. The interactive presentation may include one or more interactive order tickets corresponding to the orders for the one or more equity securities. The one or more interactive order tickets may be configured to display the order data associated with the orders for the one or more equity securities in one or more editable fields and the imbalance data associated with the one or more equity securities. The interactive GUI may display the interactive presentation on one or more user devices. The interactive GUI may update the one or more interactive order tickets based on real-time updates to one or more of the order data associated with the orders for the one or more equity securities and the imbalance data associated with the one or more equity securities. The interactive GUI may receive user input to the interactive presentation comprising an instruction to submit an interactive order ticket of the one or more interactive order tickets as an order. The gateway server may send the order to an exchange of the one or more exchanges for execution in the one or more of the auction and the cross. The gateway server may receive a message from the exchange of the one or more exchanges containing details of the execution. The data interface may send an update to the one or more trading systems to reflect the details of the execution.

BRIEF DESCRIPTION OF DRAWINGS

Other objects and advantages of the present disclosure will become apparent to those skilled in the art upon reading the following detailed description of exemplary embodiments and appended claims, in conjunction with the accompanying drawings, in which like reference numerals have been used to designate like elements, and in which:

Figure 1:
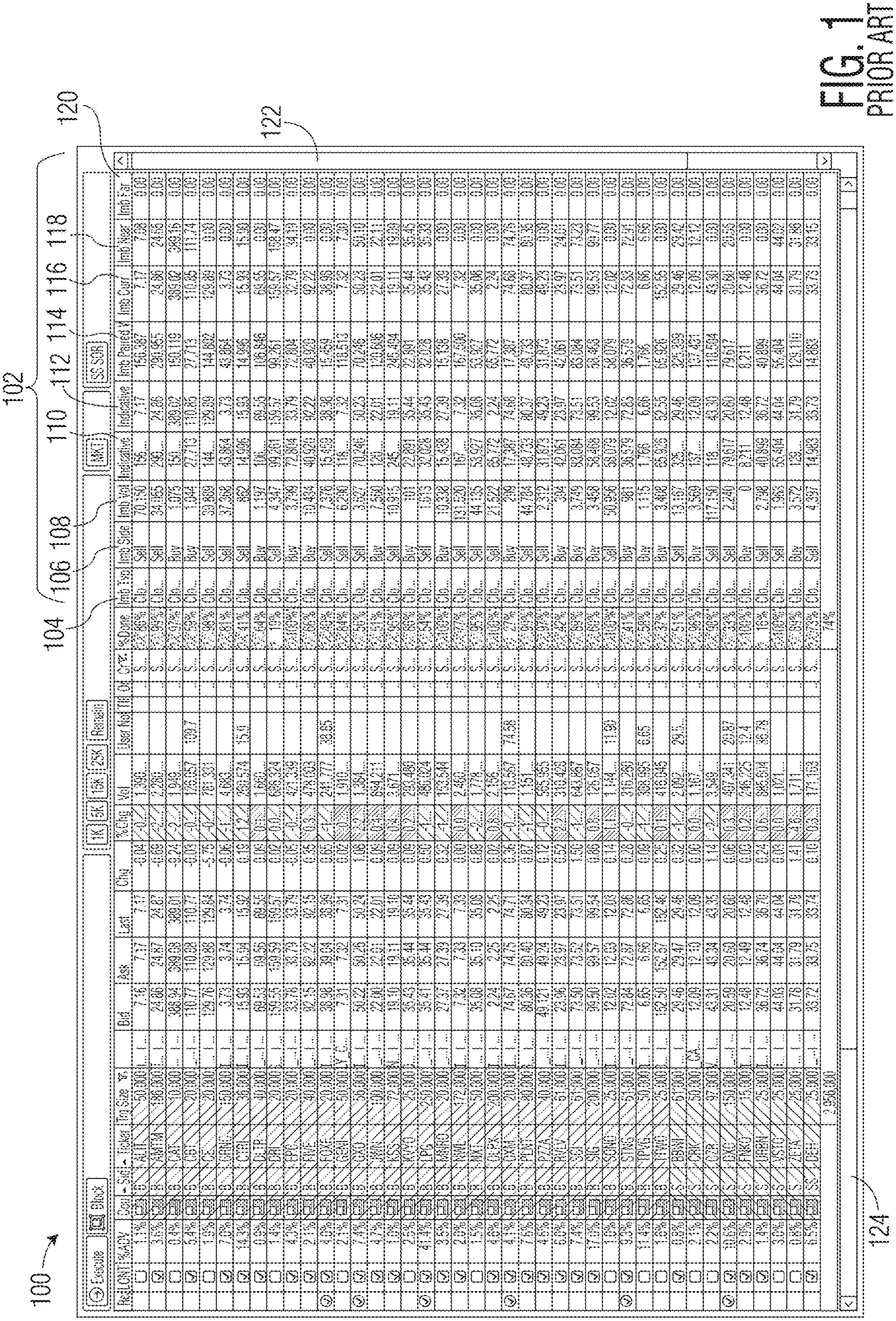
FIG. 1 PRIOR ART
FIG. 1 is a screenshot of a conventional EMS interface, according to an aspect of the present disclosure.

The figures are for purposes of illustrating examples, but it is understood that the present disclosure is not limited to the arrangements and instrumentality shown in the drawings.

DETAILED DESCRIPTION

The present disclosure will now be described more fully hereinafter with reference to the accompanying drawings, which form a part hereof, and which show, by way of non-limiting illustration, certain examples. Subject matter may, however, be described in a variety of different forms and, therefore, covered or claimed subject matter is intended to be construed as not being limited to any examples set forth herein. Among other things, subject matter may be described as methods, devices, components, or systems. Accordingly, examples may take the form of hardware, software, firmware, or any combination thereof (other than software per se). The following detailed description is, therefore, not intended to be taken in a limiting sense.

As discussed above, auctions and crosses may play a significant role in daily trading. However, there are several limitations associated with the conventional processes of monitoring and interacting with these auctions and crosses, as well as how conventional trading systems display auction/cross order imbalance data for user interaction.

In the leadup to, and throughout, certain auctions and crosses that occur on national exchanges, imbalance information may be originated and disseminated by the primary exchange that conducts the auction or cross. An order imbalance is a situation resulting from an excess of buy or sell orders (in terms of number of shares) for a specific security on a trading exchange, making it impossible to match all the orders of buyers against all those of sellers. An order imbalance exists when there are too many shares (to either buy or sell) of a listed security that cannot be fully matched by the opposite side/orders (to sell or buy) on an exchange. The imbalance represents an excess of shares to buy or sell, beyond those shares (to buy and sell) that can be "paired off" or "netted" against one another. Imbalance information can provide crucial information to traders during the auction and cross processes. The data may provide information about order flow specific to the auction or cross, and the potential final price/result of the auction or cross. In the case of an opening or closing auction or cross, the final price may be the official opening or closing price of an equity security on its primary listed exchange.

Imbalance data may be disseminated from the exchanges at predetermined times and intervals and may include information such as: "total imbalance," "market imbalance, "matched volume," "auction collar," "market order imbalance," "imbalance quantity," "unpaired quantity," "closing only interest price," "current reference price" "far indicative clearing price," "near indicative clearing price," "imbalance side," "imbalance shares," "number of paired shares," "inside match price," "paired shares," "imbalance shares," "indicative price range or price," "price variance indirection" "auction book clearing price," "imbalance side," "collar reference price," "lower auction collar," "upper auction collar," "imbalance shares," "auction type," "market imbalance quantity," "continuous book clearing price," "freeze status," "number of extensions," "significant imbalance," and "auction status."

The imbalance data may be generated by a respective exchange and disseminated through imbalance messages. The imbalance messages may include imbalance data for each symbol on the respective exchange, which may number in the thousands, and may be updated in real time. The imbalance messages containing the data are referred to by different names according to each exchange. For example, on the NYSE™, for the closing auction, it is called the "Closing Imbalance Feed."

Once trading systems receive the imbalance messages, the imbalance data must be parsed, organized, and presented in a usable and easy to read format for the end user to utilize it. Traders may use imbalance data to make trading decisions leading up to, and during the auctions/crosses. For example, traders may use the imbalance information to determine whether or not they want to participate in the auction/cross, the extent to which they want to participate in the auction/cross (e.g., what quantity of their open order(s) they try to fill via the auction/cross), and also how to participate in the auction/crosses (e.g., determined by order type, timing of the placement of the order, and price limits, if applicable).

Not only must traders monitor multiple critical imbalance information data points (e.g., imbalance side, imbalance quantity, reference price/indicative price, paired quantity, unpaired quantity, near price, and far price) for every open equity security order in their trading blotter, order management system ("OMS"), or execution management system ("EMS") (collectively "trading systems") at the same time, these data points may have different names depending on the exchange. Further, traders must monitor these data points while the imbalance information for each security may be continuously updating/changing in real time, right up until the last minutes and seconds of the auction/cross process. For example, imbalance data may be distributed by an exchange starting at 3:50 pm and the auction/cross may end at or just after 4 pm. At any given time, a trader may have one to hundreds of open equity orders in their OMS, EMS, or trading blotter that they must monitor. The result of misreading the data or simply not participating in an auction/cross because of overlooked data may be consequential. Traders may end up influencing the final auction/cross price, or more importantly, they may miss out on the potential to match up their open orders with auction/cross imbalances, which essentially represent "block liquidity," which is characterized by lower implicit execution costs to trade against. Thus, if a trader misses an opportunity to execute against auction/cross imbalances, there is an implied and real opportunity cost to doing so (e.g., higher execution costs by having to execute their orders by other means). Additionally, in the case of a closing auction/cross in particular, a trader may miss the opportunity to complete an order in their OMS, EMS, or trading blotter by the end of that trading day. This may leave the order vulnerable to timing risk and costs as a result of having to carry the order over to the next trading day. Pre-programmed trading algorithms and artificial intelligence ("AI") driven programs may face the same challenges and opportunity costs.

However, interfaces of conventional trading systems (hereinafter "trading interfaces") are severely limited when it comes to allowing traders to 1) view and interact with imbalance data, 2) monitor imbalance data for multiple symbols, 3) submit orders for execution during auctions/crosses, and 4) monitor submitted orders. For example, most conventional OMSes are not designed to receive formal imbalance information at all and do not contain any data fields to display disseminated formal imbalance information to users. Some conventional EMSes have interfaces with data fields that display some imbalance information to users, but there are a number of problems and limitations to these systems and displays.

Referring now to FIG. 1, a screenshot of a conventional EMS interface 100 is shown. As can be seen, while the conventional EMS interface 100 is able to display imbalance data 102 associated with symbols listed in the EMS, it may not be feasible to show the full set of imbalance data offered by the exchanges (e.g., the "far price" data) on a single screen. For example, the imbalance data 102 may be shown in multiple columns in the conventional EMS interface 100, such as Imbalance Cross Type 104, Imbalance Side 106, Imbalance Volume 108, Imbalance Indicative Volume 110, Imbalance Indicative Price 112, Imbalance Paired Volume 114, Imbalance Current Price 116, Imbalance Near Price 118, and Imbalance Far Price 120. However, because of limits with display size, column indicators may need to be truncated to a point where they are not visually identifiable or, in the case of Imbalance Indicative Price 112 and Imbalance Paired Volume 114, not visually distinguishable from one another. Not only does this make it difficult for a user to review and interact with the imbalance data 102, but it can also cause errors.

Moreover, because the conventional EMS interface 100 merely displays multiple symbols in list form, monitoring the imbalance data (which may be continuously updated in real time), in addition to other real-time data (such as the continuous market data), is extremely difficult when dealing with multiple symbols. This is problematic enough on a desktop display but becomes even more of an issue when the EMS interface 100 is displayed on a computing device with a small screen (e.g., tablets and smartphones). Because of the limited display space, only a limited number of symbols may be displayed on the screen at once. Accordingly, a user may have to scroll up or down (away from a first symbol) using a vertical scroll bar 122 to view imbalance data 102 of a second symbol and scroll sideways using a horizontal scroll bar 124 to view additional columns. This may make monitoring/comparing the imbalance data 102 of more than one symbol at the same time on that particular computing device difficult (requiring a user to repeatedly scroll back and forth, as well as up and down, to view both symbols individually) or even impossible (because the imbalance data 102 may update continuously and in real-time, the imbalance data 102 for the first symbol may no longer be valid by the time the user scrolls down to view the second symbol).

Furthermore, conventional trading interfaces require multiple steps to specifically interact and participate in auctions/crosses from within an EMS or OMS, adding a further burden to users and level of complexity. For example, some conventional trading interfaces may require users to enter multiple keystrokes/commands to pull up imbalance information for a particular symbol and may only allow users to look up imbalance data for one individual security at a time (e.g., via a search function), thereby preventing a user from monitoring multiple securities at once.

The problems with how conventional trading interfaces handle imbalance data is not just limited to display size. Because conventional trading interfaces do not automatically match open equity orders in a user's OMS, EMS, and/or trading blotter with the imbalance data that is disseminated by national securities exchanges (e.g., at predetermined times and intervals), users may have to navigate a series of steps in different layers of the trading interface to submit an order. For example, to place/submit an order in an auction/cross using a conventional trading interface such as the EMS interface 100, a user may have to, for each symbol, change a limit type (i.e., to Market-On-Close or Limit-On-Close), a limit price, and an order route (including up to two or more specific settings within the order route chosen). This may require a user having to open multiple windows and navigate away from the EMS interface 100 and the imbalance data that is shown. Typical trading interfaces require a user to complete five or more steps (in different levels of the interface) to participate in an auction or cross, for each security a trader is monitoring.

Every step and every discrete interaction with the interface required to participate in an auction or cross may cause latency in the process. This is a particularly acute problem for auctions/crosses because they are not only held for a limited period of time, but they are also typically the busiest times of the trading day. Indeed, with the high volume of data and the speed at which this data is susceptible to change, any latency in their processing and/or transmission can negatively impact the operation of the system, as well as cause the data to be out-of-date and/or unusable. Moreover, monitoring the imbalance data, in addition to other real-time data (such as the continuous trading market) not related to the auctions/crosses, at the same time, is extremely difficult when dealing with multiple securities. Thus, any mechanism that can reduce latency, increase the ability to interact, and improve efficiency is desirable and valuable. Hence, there is a need for a more efficient way to monitor imbalance data as well as interact with it via an improved processing system and GUI.

Examples described herein provide technical improvements to longstanding technical problems in the art. They may allow for traders to monitor imbalance data for multiple equity securities at the same time and may provide a way for traders to match open buy and sell equity orders in their EMS, OMS, and/or trading blotters with share imbalances (e.g., buy and sell imbalances) associated with auctions and crosses based on imbalance data that is disseminated by one or more national securities exchanges at predetermined times and intervals. Traders may have the option of sending some or all of their open equity orders (e.g., based on the matches) to the respective exchanges in order to execute and participate in the auction or cross, thereby addressing the aforementioned current inefficiencies and time-consuming steps required by conventional systems and trading interfaces.

Figure 2:
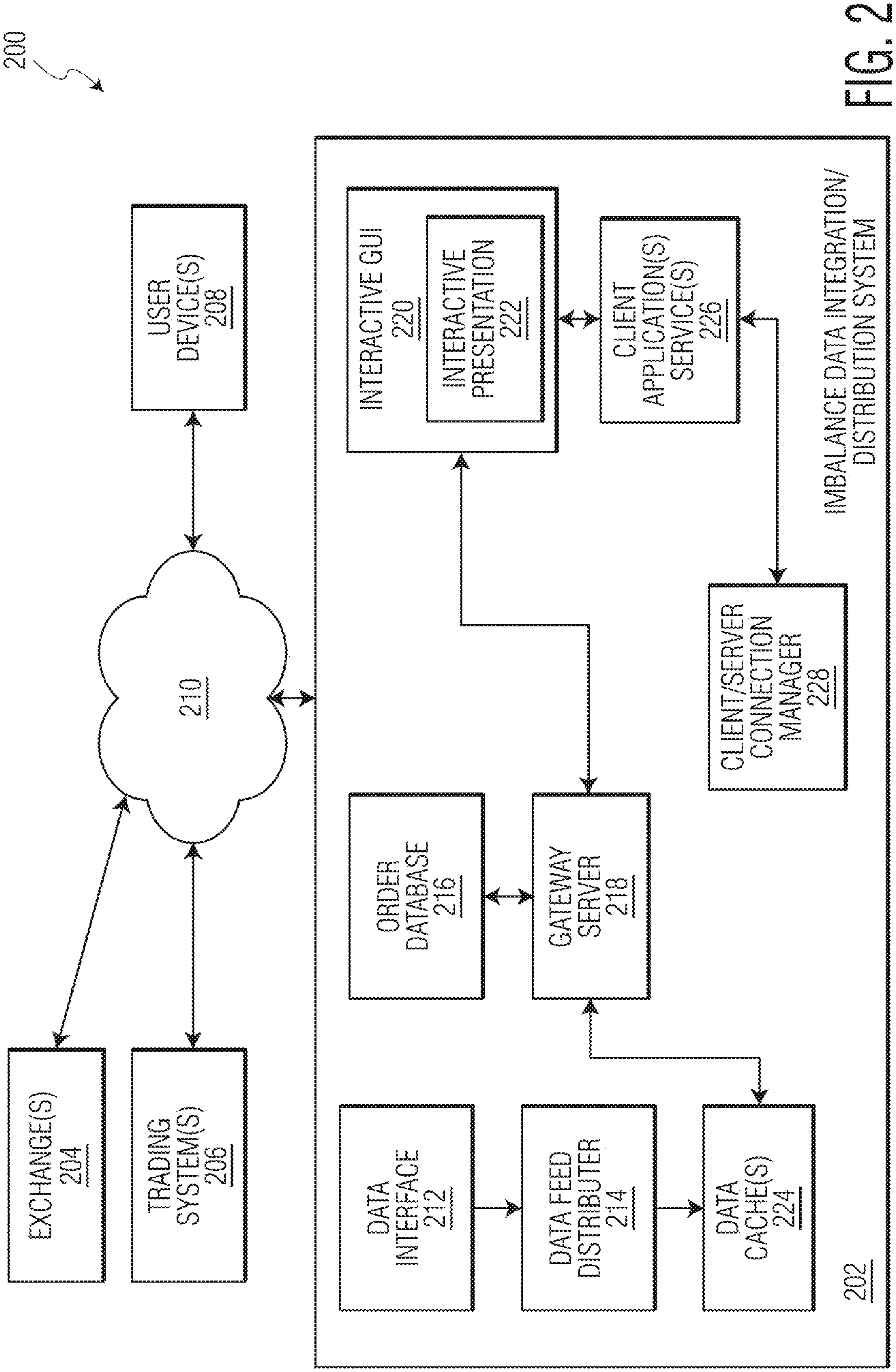
FIG. 2 is a functional block diagram example imbalance data distribution environment, according to an aspect of the present disclosure.

Referring now to FIG. 2, a functional block diagram of an example imbalance data distribution environment 200 (hereinafter "environment 200") is shown. Environment 200 may include imbalance data integration and distribution ("DID") system 202, one or more exchanges 204, one or more trading systems 206 and one or more user devices 208 (associated with at least one user). In some examples, one or more components of environment 200 (e.g., imbalance DID system 202, the one or more exchanges 204, the one or more trading systems 206, and/or the one or more user devices 208) may be communicatively coupled via one or more networks 210. Network(s) 210 may include, for example, a private network (e.g., a local area network (LAN), a wide area network (WAN), intranet, etc.) and/or a public network (e.g., the Internet).

In general, the one or more exchanges 204 may be a server computer, a desktop computer, a laptop, a smartphone, or any other electronic device known in the art configured to receive, capture, and store data (e.g., electronic orders, etc.) and/or disseminate any suitable data (e.g., market data and/or imbalance data, etc.). The one or more exchanges 204 may be any exchange where stockbrokers and traders can buy and sell securities, such as shares of stock. In an example, the one or more exchanges 204 may include the New York Stock Exchange (NYSE™) and the NASDAQ™ Stock Exchange. The one or more exchanges 204 may receive orders from one or more of the one or more trading systems 206 and the imbalance DID system 202. In addition, the one or more exchanges 204 may be a source of real-time market data that may be distributed to one or more of the one or more trading systems 206 and the imbalance DID system 202. In an example, the real-time market data may be transmitted by the one or more exchanges 204 to one or more third party systems that package and distribute the market data to the one or more trading systems 206 and/or the imbalance DID system 202. The market data that is distributed by the one or more exchanges 204 may include price data and/or trade-related data associated with one or more tradeable financial instruments. The delivery of market data from the one or more exchanges 204 may be highly time-sensitive and may involve specialized technologies designed to handle collection and throughput of massive data streams. For example, specialized software and hardware systems called ticker plants may be designed to handle collection and throughput of massive data streams, displaying prices for traders and feeding computerized trading systems fast enough to capture opportunities before markets change.

As discussed above, the one or more exchanges 204 may conduct one or more auctions/crosses at certain predetermined times throughout the trading day and imbalance data may be disseminated from the exchanges at predetermined times and intervals. The imbalance data may be distributed via an imbalance feed that provides real-time updates at specified intervals during auctions/crosses throughout the trading day for all listed securities. In an example, the imbalance feed may be separate from the ticker plants that are used to distribute the real-time market data throughout the trading day.

In general, the one or more trading systems 206 may be a server computer, a desktop computer, a laptop, a smartphone, or any other electronic device known in the art configured to receive, capture, and store data (e.g., market data and/or imbalance data, etc.) and/or disseminate any suitable data (e.g., electronic orders, etc.). The one or more trading systems 206 may be one or more of an OMS, EMS, or trading blotter. The one or more trading systems 206 may be configured to receive one or more of the market data and imbalance data from the one or more exchanges 204 and submit various types of electronic orders to the one or more exchanges 204. The one or more trading systems 206 may generate and/or store order details (e.g., symbol, side, quantity, available to trade, limit, etc.). As discussed below, the one or more trading systems 206 may also be in communication with imbalance DID system 202.

The one or more user devices 208 may include, without limit, any combination of mobile and/or stationary communication device such as mobile phones, smart phones, tablets computers, laptop computers, desktop computers, server computers or any other computing device configured to capture, receive, store and/or disseminate any suitable data. The one or more user devices 208 may include a non-transitory memory, one or more processors including machine readable instructions, a communications interface which may be used to communicate with the imbalance DID system 202, a user input interface for inputting data and/or information and/or a user display interface for presenting data and/or information. The one or more user devices 208 may also be configured to format and display an interactive GUI 220 of the imbalance DID system 202 on the user interface of the one or more user devices 208.

The imbalance DID system 202 may include a data interface 212, a data feed distributor 214, one or more data caches 224, a gateway server 218, an interactive GUI 220 configured to generate an interactive presentation 222, one or more client applications and/or services 226, and a client/server connection manager 228. In some examples, the one or more components of the imbalance DID system 202 may communicate with each other via a data and control bus. Although the imbalance DID system 202 is shown as one component (e.g., a server), the imbalance DID system 202 may include one or more components (e.g., one or more servers) that are co-located and/or linked across one or more networks.

The imbalance DID system 202 may include at least one processor (e.g., processing device 702 shown in FIG. 7) and non-transitory memory (e.g., memory 706 shown in FIG. 7) storing one or more routines and or algorithms for performing the functions of the imbalance DID system 202 described herein. An example implementation of one or more components of the imbalance DID system 202 is shown by computer system 700 (shown in FIG. 7).

In some examples, the imbalance DID system 202 may obtain the imbalance data from the one or more exchanges 204 and order information from the one or more trading systems 206 via the data interface 212. The data interface 212 may include one or more input and/or output interfaces (e.g., an electronic device including hardware circuitry, an application on an electronic device) for communication with other components of environment 200.

The data interface 212 may be configured to obtain the imbalance data and the order data through any suitable electronic data collection technique, such as scraping (e.g., blotter scraping). For example, the data interface 212 may obtain the imbalance data and the order data through one or more data feeds (e.g., streaming (live) data feeds), one or more file transfer protocols (e.g., one or more secure file transfers), one or more interfaces, and/or one or more application programming interfaces (APIs). In an example, one or more of the imbalance data and the order data may be pushed to the data interface 212. In another example one or more of the imbalance data and the order data may be retrieved by the data interface 212. The data interface 212 may include security protection (e.g., encryption, decryption) to protect the integrity of the obtained data.

In an example, the data interface 212 may obtain the imbalance data directly from the one or more exchanges 204. Although the one or more exchanges 204 may also provide the imbalance data to the one or more trading systems 206 as well, receiving the imbalance data directly from the one or more exchanges 204 may provide the most up-to-date information with minimal latency. Each of the exchanges of the one or more exchanges 204 may push all of the imbalance data for all of the symbols on the respective exchange. Accordingly, the data interface 212 may be a specially configured interface (e.g., a specially configured API) that may be able to communicate with the one or more exchanges 204 and receive the imbalance data with minimal latency.

The data interface 212 may perform one or more of filtering, data normalization, data reformatting, data aggregation and the like. In some examples, electronic data that may be obtained by the data interface 212 may include data that may be unable to be processed (e.g., data that includes one or more errors and the like). In some examples, different sources among the one or more exchanges 204 and the one or more trading systems 206 may transmit data with various unique, non-standard values and/or data formats (e.g., proprietary formats). Furthermore, data content may correspond to different forms of data, such as different currencies, date formats, time periods, etc.

Non-limiting examples of data filtering that may be performed by the data interface 212 may include excluding null data values, excluding corrupted data, excluding outlier data values (e.g., a data value outside of a pre-defined value range, outside of a pre-defined time range) and the like.

In some examples, the data interface 212 may reformat the collected data to one or more common formats and/or normalize the collected data. In some examples, the data interface 212 may be configured to aggregate and/or combine at least a portion of the collected data (e.g., according to one or more pre-defined categories (such as a type of data, one or more predetermined time periods, etc.). The data interface 212 may normalize data received from different sources to ensure that formatting/naming/categorization of the data is consistent. This may allow the data to be processed and displayed by the interactive GUI 220 in a consistent, normalized manner, regardless of the original data source.

Data feed distributor 214 may be configured to receive the collected data from the data interface 212 and route the collected data to an appropriate data cache within the one or more data caches 224. As discussed above, the imbalance data may be disseminated by the one or more exchanges 204 at predetermined times via imbalance messages. The imbalance data is updated continuously and in real-time during the predetermined times. The imbalance messages may include imbalance data for each symbol on the respective exchange, which may number in the thousands. Likewise, the order data that is entered into the one or more trading systems 206 (e.g., either manually or by program/algorithm) may be based on market data disseminated by the one or more exchanges 204, which includes massive data streams that are also updated in real-time.

Because of the amount of data and real-time updates to the data, the one or more data caches 224 may be a temporary random-access memory (RAM) or other type of high-speed short-term memory. By storing the imbalance data and the order data in this manner, the data feed distributor 214 may reduce the amount of non-volatile memory required for the imbalance DID system 202 to operate and increases processing efficiency while reducing latency. RAM is a form of electronic computer memory that can be read and changed in any order. A RAM device may allow data items to be read or written in almost the same amount of time irrespective of the physical location of data inside the memory, in contrast with other direct-access data storage media (such as hard disks and magnetic tape), where the time required to read and write data items varies significantly depending on their physical locations on the recording medium, due to mechanical limitations such as media rotation speeds and arm movement.

The gateway server 218 may be configured to retrieve one or more of the imbalance data and the order from the one or more data caches 224. In an example, the gateway server 218 may include a tick engine and may be coupled to the order database 216 to enable processing large amounts of imbalance data and order data that may change rapidly (e.g., user orders, market events, quotes, etc.). The gateway server 218 may match one or more attributes of the imbalance data with one or more attributes of the order data to create potential orders and/or order tickets. Each potential order and/or order ticket may be stored in the order database 216 and may be integrated into a presentation package that is sent to the interactive GUI 220. The presentation package may include, for an example, the matched imbalance data and order data, an indication of order status, etc. In an example, the presentation package may be updated in real-time with changes in one or more of the imbalance data and the order data.

The interactive GUI 220 may be configured to integrate the presentation package into an interactive presentation 222 that may include one or more of an alert and an interactive order ticket. In an example, the interactive GUI 220 may update the interactive presentation 222, including one or more of the alert and the interactive order ticket, in real time as the presentation packages is updated. In another example, the interactive GUI 220 may update the interactive presentation 222, including one or more of the alerts and the interactive order ticket, at predetermined intervals. The interactive presentation 222 may be transmitted to the one or more user devices 208. The interactive presentation 222 may allow a user to view the imbalance data and the order data via the interactive order ticket. Via user input to the interactive presentation 222, which may be transmitted to the interactive GUI 220, the user may be able to submit an order. The interactive GUI 220 may relay the user input to the gateway server 218, which may finalize and submit an order to the one or more exchanges 204 and update one or more of the order database 216 and the presentation package. The gateway server 218 may also send updates to the one or more trading systems 206 via the data interface 212. For example, the gateway server 218 may send one or more of details of a submitted order to the one or more trading systems 206. The gateway server 218 may also receive execution details of a submitted order from the one or more exchanges 204 when an auction/cross finishes, and may send the execution details to the one or more trading systems 206.

In some examples, the interactive presentation 222 may include different configurations based on an underlying application and/or service for which it is launched. For example, the interactive GUI 220 may have a first configuration for a mobile application, may have a second (different) configuration for a desktop application and may have a third (different) configuration for a spreadsheet application. In some examples, the interactive order ticket in the interactive presentation 222 may have different configurations.

The imbalance DID system 202 may include one or more client applications and/or services 226 for creating instances of application(s) and/or service(s) based on attributes of the one or more user devices 208 (e.g., device type, screen size, etc.). For example, the one or more client applications and/or services 226 may create instances of one or more of a trading desktop, a spreadsheet application, a mobile application (e.g., an application that may be suitable for a display screen of a mobile device such as a tablet and/or smartphone) streaming (e.g. raw, normalized, filtered and/or aggregated) data feeds and/or one or more APIs for receiving data in one or more object-oriented programming languages (e.g., Java™, Python™, R™, etc.).

The imbalance DID system 202 may include a client/server connection manager 228 (also referred to as connection manager 228) configured to manage client to server connection requests. In general, connection manager 228 may manage connection request(s) of the one or more user devices 208 to the imbalance DID system 202 and coordinate with the one or more client applications and/or services 226.

Figure 3:
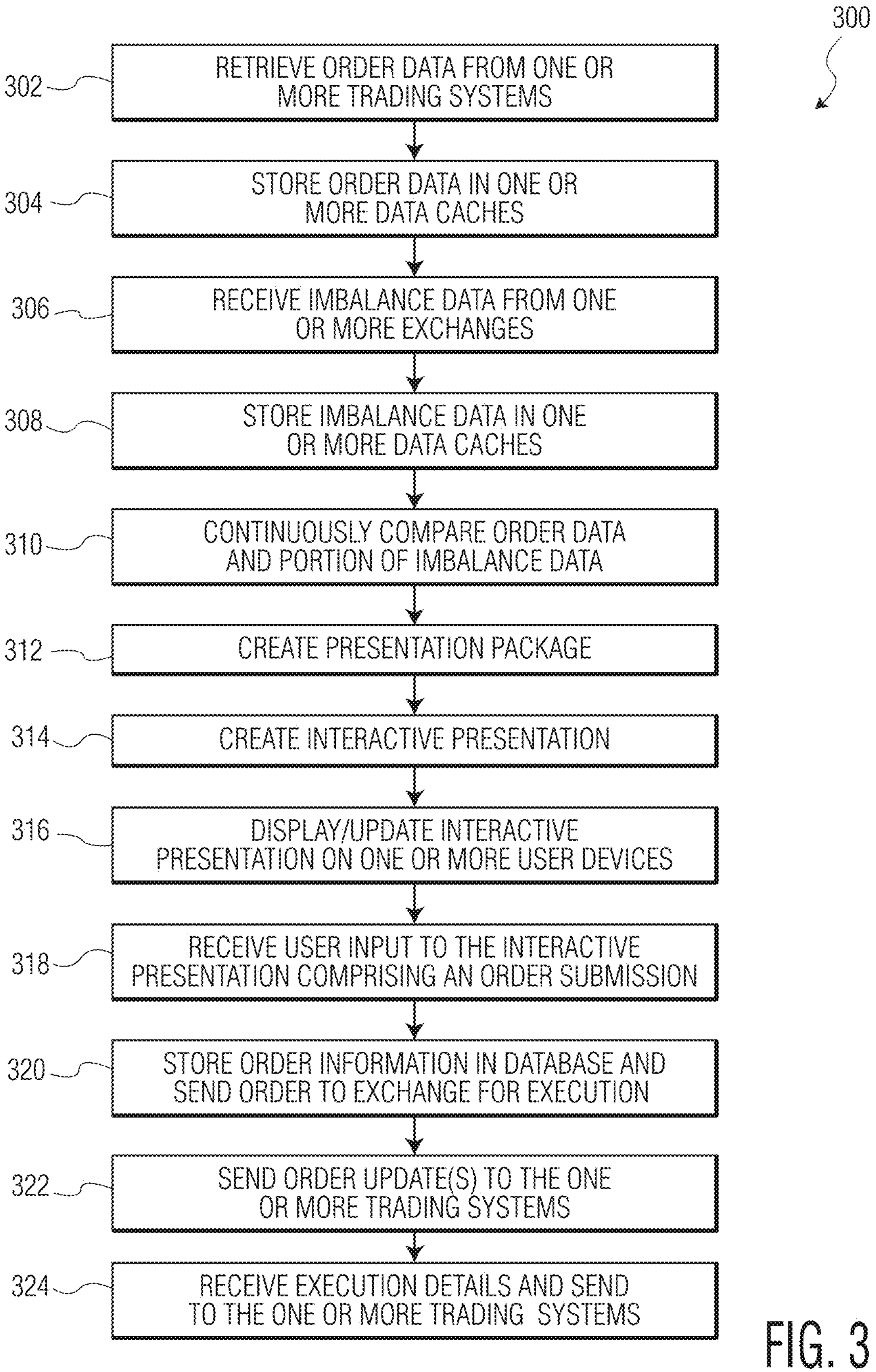
FIG. 3 is a flow chart illustrating a method of matching open equity orders from one or more trading systems with liquidity from auctions/crosses (i.e., imbalance data) disseminated by one or more exchanges, according to an aspect of the present disclosure.

Referring now to FIG. 3, a flow chart illustrating a method 300 of matching open equity orders from one or more of an OMS, EMS, and trading blotter with liquidity from auctions/crosses (i.e., imbalance data) is shown.

At step 302, the data interface 212 may retrieve the order data from the one or more trading systems 206. In an example, the order data may be open equity orders, characterized by shares of an entire order for a security within an OMS, EMS, or trading blotter that remain uncommitted, and by definition, unfilled (i.e., the shares may be free/available to be executed anywhere). Thus, if no match occurs via the imbalance DID system 202, or a user chooses to not submit an order via the imbalance DID system 202, the user is free to execute those available shares to trade, by any other means (i.e., the shares are not tied up by the imbalance DID system 202). The order data may include one or more of symbol, side, quantity, available to trade, limit, etc. about eligible, open equity securities orders to buy, buy to cover, sell, and sell short.

In an example, the data interface 212 may continuously scan the one or more trading systems 206 (e.g., via blotter scraping) to retrieve the order data from the one or more trading systems 206. In another example, the data interface 212 may perform the continuous scanning at predetermined times (e.g., scheduled by the tick engine within the gateway server 218) that corresponds to the predetermined times of auctions/crosses offered by the one or more exchanges 204. For example, the data interface 212 may begin continuously retrieving the order data when the one or more exchanges 204 disseminate the imbalance data, or it may begin continuously retrieving the order data at a predetermined time before the one or more exchanges 204 disseminate the imbalance data.

In example, the data interface 212 may scan for all open equity security buy and sell orders (buy, cover, sell, sell-short) in the one or more trading systems 206 for the order data. In another example, the data interface 212 may scan only a subset of open equity security buy and sell orders (buy, cover, sell, sell-short) in the one or more trading systems 206 for the order data. A user may be able to select the subset of orders to be scanned within the OMS, EMS, and/or trading blotter by using an integrated functionality of the OMS, EMS, and/or trading blotter interface (i.e., by checking a box next to a particular security). In another example, the data interface 212 may scan all equity securities in the one or more trading systems 206 for the order data.

At step 304, the data feed distributor 214 may store the order data in the one or more data caches 224. The order data stored in the one or more data caches 224 may be continuously updated/overwritten in real-time to reflect real-time changes.

At step 306, the data interface 212 may receive the imbalance data from the one or more exchanges 204. The imbalance data may be for all securities listed on the respective exchange of the one or more exchanges and may be disseminated at predetermined times via imbalance messages. The imbalance data is updated continuously and in real-time during the predetermined times. The data interface 212 may parse the imbalance messages and may extract the imbalance data. The imbalance data may include, for all symbols at the respective exchange of the one or more exchanges 204, one or more of: "total imbalance," "market imbalance, "matched volume," "auction collar," "market order imbalance," "imbalance quantity," "unpaired quantity," "closing only interest price," "current reference price" "far indicative clearing price," "near indicative clearing price," "imbalance side," "imbalance shares," "number of paired shares," "inside match price," "paired shares," "imbalance shares," "indicative price range or price," "price variance indirection" "auction book clearing price," "imbalance side," "collar reference price," "lower auction collar," "upper auction collar," "imbalance shares," "auction type," "market imbalance quantity," "continuous book clearing price," "freeze status," "number of extensions," "significant imbalance," and "auction status."

At step 308, the data feed distributor 214 may store the imbalance data in the one or more data caches 224. The imbalance data stored in the one or more data caches 224 may be continuously updated/overwritten in real-time to reflect real-time changes.

At step 310, the gateway server 218 may retrieve the order data and only a portion of the imbalance data from the one or more data caches and continuously compare the order data and the portion of the imbalance data. The portion of the imbalance data may be associated with only the equity securities included in the order data, and may be determined based on a symbol of the equity security. In this manner, the gateway server 218 may only need to retrieve and process a small subset of the total imbalance data received by the data interface 212 and stored in the one or more data caches 224.

At step 312, the gateway server 218 may create a presentation package. In an example, the presentation package may include order data associated with all orders for equity securities received from the one or more trading systems 206 paired with corresponding imbalance data from the portion of the imbalance data based on symbol. In another example, the presentation package may include order data associated with open orders for equity securities received from the one or more trading systems 206 paired with corresponding imbalance data from the portion of the imbalance data based on symbol. In another example, the presentation package may include only order data associated with open orders determined by the gateway server 218 to match imbalance data from the portion of the imbalance data. The match may be a determination that an open order of the one or more orders is on an opposite side of the imbalance data associated with the one or more equity securities and a quantity of the open order can be at least partially satisfied by a net imbalance of the imbalance data associated with the one or more equity securities. The presentation package may be updated in real-time with changes in one or more of the imbalance data and the order data.

At step 314, the interactive GUI 220 may create the interactive presentation 222 based on the presentation package. The interactive presentation 222 may include one or more of an alert and an interactive order ticket. The interactive order ticket may include one or more data fields that include real-time information from the order data (e.g., ticker, side, order limit price or default to "market order" if no limit price is present, and open/available shares to trade) that may continuously update. The one or more data fields may also include imbalance data (e.g., "Auction/Cross Type," "Imbalance Side," "Imbalance Quantity," "Paired Quantity," "Unpaired Quantity," "Reference Price," "Near Price," "Far Price," "Closing Only Interest Price," and "Continuous Book Clearing Price," "Collar Reference Price," "Lower Auction Collar," "Upper Auction Collar," "Auction/Cross Status," etc.).

At step 316, the interactive GUI 220 may display the interactive presentation 222 on the one or more user devices 208 and continuously update the interactive presentation 222 in real-time. For example, if the program gateway server determines, based on the continuous comparison, that the "Imbalance Side" is on the opposite side of an open order (i.e., the "Imbalance Side" is "sell" and the open order is a "buy") and the "Imbalance Quantity" or "Unpaired Quantity" is greater than some minimum quantity or percentage of the available shares to trade from the order data, which may be determined by the user, the interactive order ticket may turn green or some other color of the user's choosing. The interactive GUI 220 may also provide an alert (e.g., audible or visual, such as flashing for an optional number of seconds). If the user has a limit price on an open order, the interactive order ticket may not turn green until the auction/cross reference price is at or better than the limit price within the interactive ticket.

The interactive GUI 220 may populate a "Quantity" field in the interactive order ticket with the "Imbalance Quantity" or "Unpaired Quantity." The "Quantity" field may never exceed a maximum available shares to trade. In an example, the "Quantity" field may be continuously updated in real-time. In another example, the "Quantity" field may be updated on a predetermined delay in order to give the user a chance to send the order with the quantity they see in the "Quantity" field at that moment. The user may adjust the "Quantity" field up or down by toggling "up and down" adjustments via numeric controls and/or by manually entering a quantity. Once a user manually adjusts the "Quantity" field, the system may stop automatically updating the "Quantity" field with the "Imbalance Quantity" or "Unpaired Quantity" being disseminated by the exchange of the one or more exchanges 204. The "Imbalance Quantity" or "Unpaired Quantity" field may continue to be updated, so the user can manually adjust the "Quantity" field accordingly. In an example, a user may choose to have the system update the quantity field with a percentage of the "Imbalance Quantity" or "Unpaired Quantity" rather than the whole "Imbalance Quantity" or "Unpaired Quantity."

In an example, the interactive GUI 220 may change the color of the interactive order ticket (e.g., to red) if there are no available shares to trade (i.e., the order is no longer an "open order") or the reference price is away from their limit price. The imbalance data fields may still continue to populate and update. This may allow the user to continue to monitor the imbalance data for an auction or cross even if they can't participate in it since they have no available shares to trade, or their limit price is out of range from the current reference price.

In another example, the interactive GUI 220 may change the color of the interactive order ticket (e.g., to grey) if the "Imbalance Side" is on the same side of an open order (i.e., the imbalance side is "sell" and the open order side is "sell" or "sell short"). This may indicate that an open order with available shares to trade exists, but there is no order imbalance liquidity to match up against at that moment. A color change (e.g., also to grey) may also occur when the current "Reference Price" is away (below or above) from the limit price specified in the interactive order ticket. The open order information and the order imbalance information may continue to update in real-time. If the order imbalance side flips (i.e., turns from "sell' to "buy") and a match is created, the ticket/display may turn green, and any optional alerts may be triggered. Likewise, if the "Reference Price" changes to fall within the user's limit price, the ticket may turn green, and any optional alerts may be triggered. In an example where a limit price is out of range, the field containing the limit price may be bolded so the user can determine quickly why the interactive order ticket is grey (i.e., because of the limit price, rather than being on the same side as the "Imbalance Side").

At step 318, the user may submit an order via user input to the interactive presentation 222. In an example, the user input may include a selection of a single "submit" button displayed on the interactive order ticket. In another example, the user input may include a selection of an automatic submission feature in the interactive presentation 222.

The interactive GUI 220 may change the color of the interactive order ticket upon receiving the user input. For example, if a user submits an order with a partial amount of available shares, resulting in a balance of available shares to trade, the interactive order ticket may turn grey until an imbalance update. This may prevent/warn a user from sending subsequent orders with their remaining available shares to trade against imbalance order data that may not reflect their own initial order. In a grey state, a user may have the option of still sending additional orders if they choose. Once the order imbalance data updates, if a new match is created, the ticket may turn green, and any optional alerts may be triggered.

Using certain order types specific to auctions and crosses, such as a "Closing D-Order," users may still send an order with their available shares to trade and try to participate in an auction or cross, even if their order is on the same side as the "Imbalance Side." For example, if the open order is a "sell" order and the "Imbalance Side" is also "sell," the user may send an order and add to the "Imbalance Quantity" and/or "Unpaired Quantity" in the auction or cross. A user may also send a "Closing Offset" or "Imbalance Only" order in anticipation of the order imbalance side switching before the end of the auction or cross.

When no order imbalance information is being disseminated by the exchange (e.g., the current time is outside of the predetermined times and intervals for the auction or cross to disseminate imbalance information on that equity security), the interactive order ticket may not populate with order imbalance information, regardless of what state/color the interactive order ticket is in. However, users may still send all or some of their "available shares to trade" to the auction or cross, ahead of the order imbalance dissemination process in order to participate in an upcoming auction or cross. The ability to send orders to participate in upcoming auctions or crosses may be determined by eligibility times designated by each exchange. When an auction or cross finishes, the order imbalance data may disappear until the data for the next auction or cross begins to be disseminated by the exchange. The system may automatically determine which auction or cross (i.e., opening or closing) to default to, based on the exchanges' rules surrounding operational hours.

Order types used to send available shares to trade to an exchange's auction or cross, may include any type of order that may be sent during an auction or cross. Examples of order types include, but are not limited to, "Limit on Open (LOO)," "Limit on Close (LOC)," "Market on Open (MOO)," "Market On Close (MOC)," "Imbalance Only (IO)," "Closing Offset (CO)," "Closing D-Order," and "Intermarket Sweep Order (ISO)." Users will be able to manually choose the order type via the interactive order ticket, as well as choose a default order type in the settings menu of the interactive presentation 222 (such as MOC, LOC, or D-Quote), for all tickets based on opening or closing auctions and crosses. During certain times of the day, and under certain conditions, some order types may not be available, and the interactive order ticket may indicate (e.g., by greying them out) that they are not available.

If the "order limit price" is included in the order data, the interactive order ticket may populate with the same price limit and may prevent the user from using "MOC" and "MOO" orders unless the user manually removes the limit price from the interactive order ticket. This may occur even if the user has defaulted all trade tickets to "MOC" or "MOO" order types in, for example, a settings menu of the interactive presentation 222. The "order limit price" from the order data may override the user specified "MOC" or "MOO" default order type selected by a user in, for example, a settings menu of the interactive presentation 222. If the limit field is populated in the interactive order ticket, the user may be restricted to sending price limit orders to the exchanges such as "LOO," "LOC," or Closing D-Order. The "MOC" default may be replaced by a Closing D-Order, and the "MOO" default may be replaced by "LOC" order type depending on the exchange. For some exchanges, the "MOC" default may be replaced by "LOC." The user may change or eliminate the limit price in the interactive order ticket by toggling up/down adjustments via numeric controls or manually typing in the desired limit price. If the user changes the limit price to a price exceeding the limit price contained within their OMS, EMS, or trading blotter, the interactive GUI 220 may generate a warning notification.

At step 320, the gateway server 218 may store the order and any associated information in the order database 216 and send the order to the appropriate exchange of the one or more exchanges 204 for execution.

At step 322, the gateway server 218 may update one or more of the order database 216 and the presentation package and may send one or more order updates to the one or more trading systems 206 via the data interface 212. For example, the gateway server 218 may send one or more details of the submitted order to the one or more trading systems 206.

In an example, the gateway server 218 may send a message to the one or more trading systems 206 to allow for an automatic update of the user's "open order quantity" aka "shares available to trade" in their OMS, EMS, and/or Trading Blotter to reflect the number of shares committed in the order sent to the exchange. The update to the OMS, EMS, and/or trading blotter may be reflected in the order data, so that the "available shares to trade" field in the one or more data caches 224 may also be updated. As a result, the interactive presentation 222, including the interactive order ticket may be continuously updated to reflect the correct number of "available shares to trade."

At step 324, the gateway server 218 may receive execution details of the submitted order from the one or more exchanges 204 when an auction and/or cross finishes and may send the execution details to the one or more trading systems 206. The execution details may reflect that the submitted order was executed. Alternatively, the execution details may reflect that the submitted order as not executed. The gateway server 218 may send a message to the one or more trading systems 206 to allow for an automatic update of the user's "open order quantity" aka "shares available to trade" in their OMS, EMS, and/or Trading Blotter to reflect the number of shares in the submitted order sent to the exchange are either no longer available (i.e., the submitted order was executed) or no longer committed (i.e., the submitted order was not executed).

The interactive GUI 220 may update the interactive presentation 222 to include an open order display that shows the details of that order (e.g., ticker, side, order size, price limit, time sent, and order type). If applicable/allowed (e.g., based on the rules of each particular exchange and/or order type and time of day), a user may modify or cancel an open order from the open order display.

If an order is cancelled, the open order display may disappear and the gateway server 218 may update the user's "open order quantity" in their OMS, EMS, or trading blotter. The update to the OMS, EMS, and/or trading blotter may be reflected in the order data, so that the "available shares to trade" field in the one or more data caches 224 may also be updated. As a result, the interactive presentation 222, including the interactive order ticket may be continuously updated to reflect the correct number of "available shares to trade."

When an auction or cross ends, the data interface 212 may receive a message from the exchange of the one or more exchanges 204 containing details of any fills received from participating in said auction or cross, after it concludes. The gateway server 218 may send an update to the one or more trading systems 206 and the user's OMS, EMS, or trading blotter may be updated to reflect the trade execution details, including "shares filled," "price," "exchange," and "time received."

In an example, a user may manually create an interactive order ticket. For example, from within the interactive presentation 222, a user may select a button to create an interactive order ticket (e.g., "add a ticker" button). This may update the order database 216 and create a new line item. A new interactive order ticket may appear and may default to red or a different color the user chooses (indicating the inability to create and send orders to an exchange).

If the user enters a valid ticker symbol, at appropriate times (based on the applicable exchange for that ticker), the interactive order ticket may be automatically populated with the associated imbalance. However, the remainder of the fields of the interactive order ticket may remain blank since there is no order data. A user may manually enter the details of an order they would like to send to an exchange, including a quantity and limit price, but the "available shares to trade" field may remain greyed out as there are no details originating from the one or more trading systems 206.

At this point, the interactive order ticket may turn grey or some other color of the user's choosing. A user may continue to monitor the imbalance data as it updates, however, the quantity field may remain static (unless the user manually changes it), and the ticket may remain the same color because the matching functionality is missing as a result of adding the ticker symbol manually. Likewise, since an interactive order ticket that originates from the manual process function will not be associated with an order in the one or more trading systems 206, the one or more trading systems 206 may not be updated by the imbalance DID system 202, including execution details received by the exchange at the completion of an auction or cross. Depending on the one or more trading systems 206, execution details (from the results of the auction or cross) may be sent if the one or more trading systems 206 allows the imbalance DID system 202 to create a new line item within the OMS, EMS and/or trading blotter. If so, the order details of the security the user manually added to the application, including the security ticker, side, quantity filled, time stamps, exchange, and execution price may show in the user's OMS, EMS, and/or trading blotter.

Figure 4A:
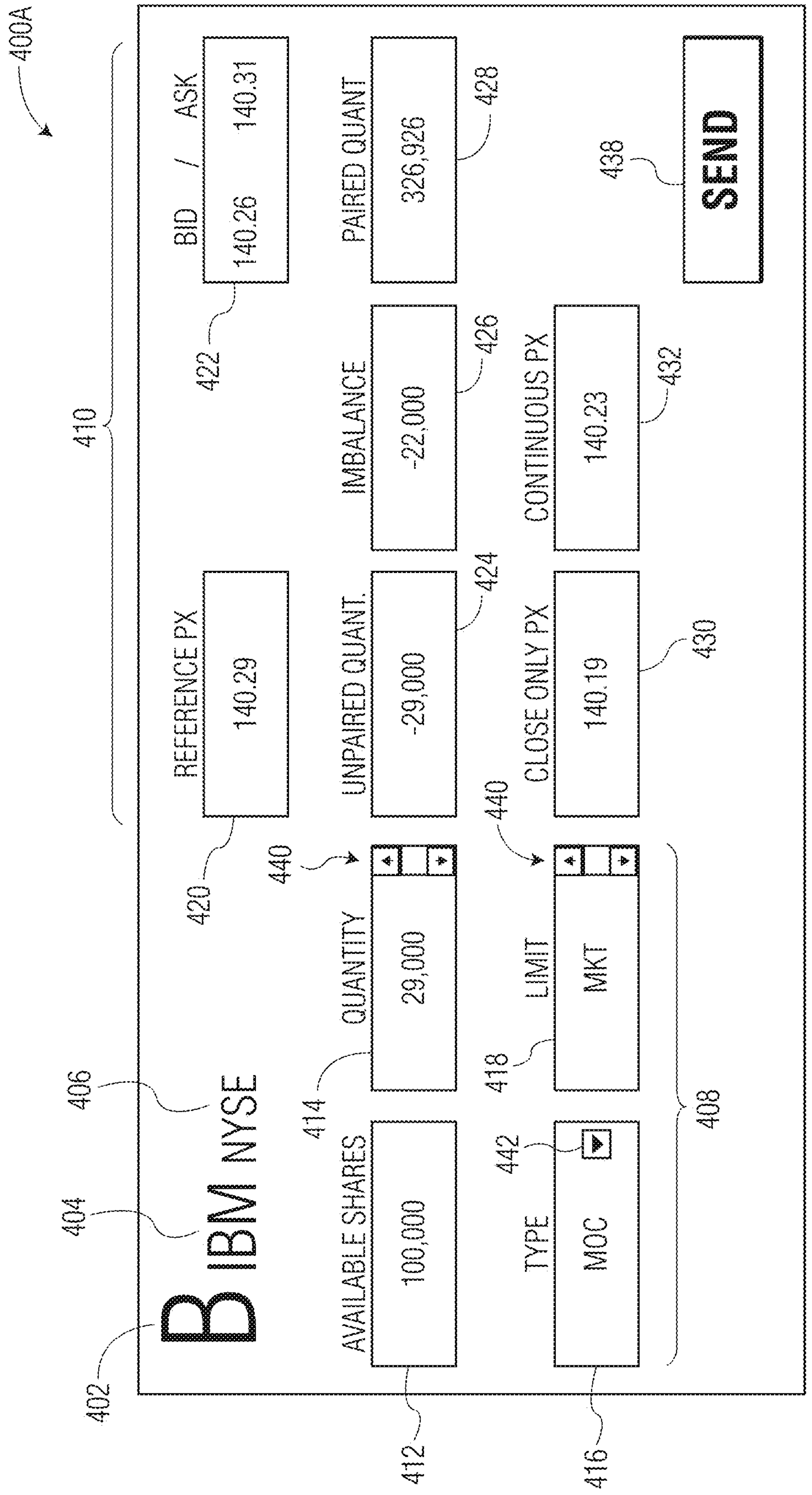
FIG. 4A is a diagram of an interactive order ticket for a buy order, according to an aspect of the present disclosure.
Figure 4B:
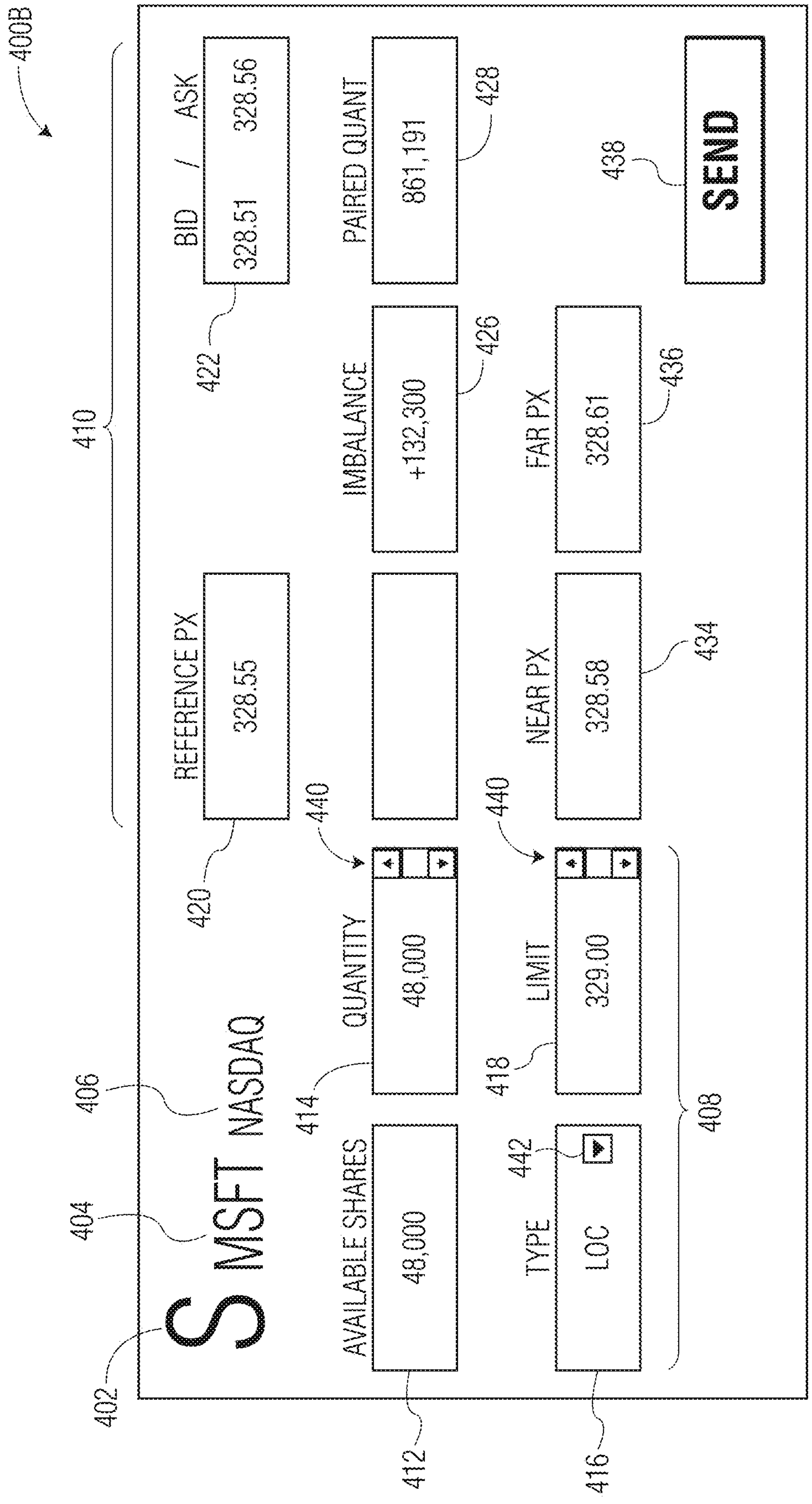
FIG. 4B is a diagram of an interactive order ticket for a sell order, according to an aspect of the present disclosure.

Referring now to FIGS. 4A-4B, diagrams of examples of an interactive order ticket 400 are shown. FIG. 4A shows an interactive order ticket 400A for a buy order. FIG. 4B shows an interactive order ticket 400B for a sell order. The interactive order ticket 400 may include a buy/sell indicator 402, symbol 404, and an exchange identifier 406. The buy/sell indicator 402 may indicate which side of a transaction the order is on.

The interactive order ticket 400 may include one or more order data fields 408 and one or more imbalance data fields 410 on a single screen. The one or more order data fields 408 may include, for example, available shares 412, quantity 414, order type 416, and limit 418. The field for order type 416 may include a drop-down button 442 that, upon selection by the user, allows the user to select any of the order types described herein. In an example, the one or more order data fields 408 may be continuously updated based on the order data. In another example, a user may change the value of the one or more data fields 408 (e.g., by typing and or selecting an up/down adjustment via numeric controls 440). The one or more imbalance data fields 410 for the buy order may include reference price 420, bid/ask 422, unpaired quantity 424, imbalance 426, paired quantity 428, close only price 430, and continuous price 432. The one or more imbalance data fields 410 for the sell order may include reference price 420, bid/ask 422, imbalance 426, paired quantity 428, near price 434, and far price 436. In an example, the one or more imbalance data fields 410 may be continuously updated based on the imbalance data. The interactive order ticket 400 may include a send button 438 that allows the user to submit an order via a single user input (e.g., click, tap, etc.).

Figure 5:
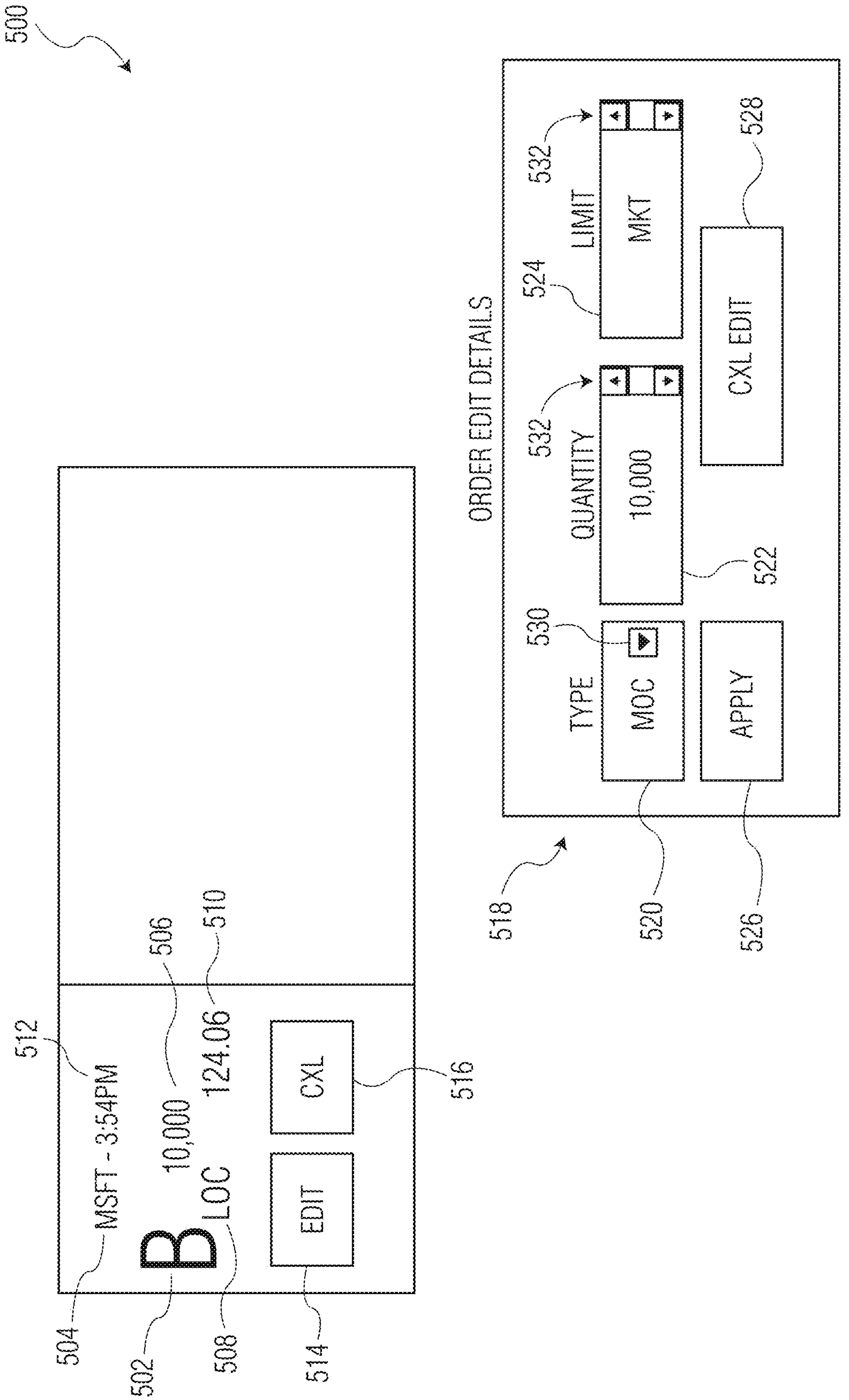
FIG. 5 is a diagram of an example open order display, according to an aspect of the present disclosure.

Referring now to FIG. 5, a diagram of an example open order display 500 generated for an order sent to an exchange is shown. The open order display 500 may be for a buy order and may include a buy/sell indicator 502, a symbol 504, a quantity 506, an order type 508, and a limit price 510. The open order display 500 may also include a sent time 512. The open order display 500 may also include an edit button 514 and a cancel button 516. Upon a selection of the edit button 514, an edit order menu 518 may be displayed. The edit order menu 518 may be displayed within the open order display 500 or it may be displayed as a separate pop up. The edit order menu 518 may allow a user to edit one or more of order type 520, quantity 522, and limit 524. The user may change the value of the one or more of the quantity 522 and the limit 524 (e.g., if a numerical value representing a limit price is used) by typing and or selecting an up/down adjustment via numeric controls 532). The field for order type 520 may include a drop-down button 530 that, upon selection by the user, allows the user to select any of the order types described herein. The edit order menu 518 may include an apply button 526 to enact edits and a cancel edit button 528 to cancel edits.

In example, an open order display 500 may be created for each order sent to an exchange. Individual open order displays 500 may be grouped together. Once a number of open order displays 500 for a given symbol exceeds the maximum available space dedicated to open order displays 500 for that symbol, a scroll bar may be created beneath the open order displays 500 for that symbol, within the maximum available space, that may allow the user to scroll back and forth and see additional open order displays 500 (e.g., in order of the most newly created open order display 500 to the oldest). For example, as the user scrolls to the right, the most recent open order displays 500 may become hidden so that the total space occupied by the open order displays 500 for a symbol does not change.

The open order displays 500 within the given space may move positions, or become temporarily hidden, as older open order display 500 are revealed as the scroll bar is slid back and forth. When the scroll bar is slid all the way to the right, the oldest (e.g., in terms of time stamp) open order display 500 may be in the last position (from left to right). If the scroll bar is slid back all the way to the left, the more recent open order displays 500 may be shown again, and the most newly created open order display 500 (e.g., in terms of time stamp) may appear in the first position (from left to right). Displaying the open order displays 500 in this fashion may allow the user to accommodate a series of open order displays 500 for a given symbol when necessary and may provide functionality across a variety of user devices with various screen sizes, including those with a small screen.

In an example, the matching of imbalance data and submission of an order may be automated (e.g., via one or more of algorithm and artificial intelligence/machine learning). A user may choose to default one or more orders to "automate" or "manual" (in which case a user must manually choose which orders to automate) in, for example, a settings menu of the interactive presentation 222. Both settings (automate "on" or automate "off") may be visually reflected in the interactive presentation 222.

Figure 6:
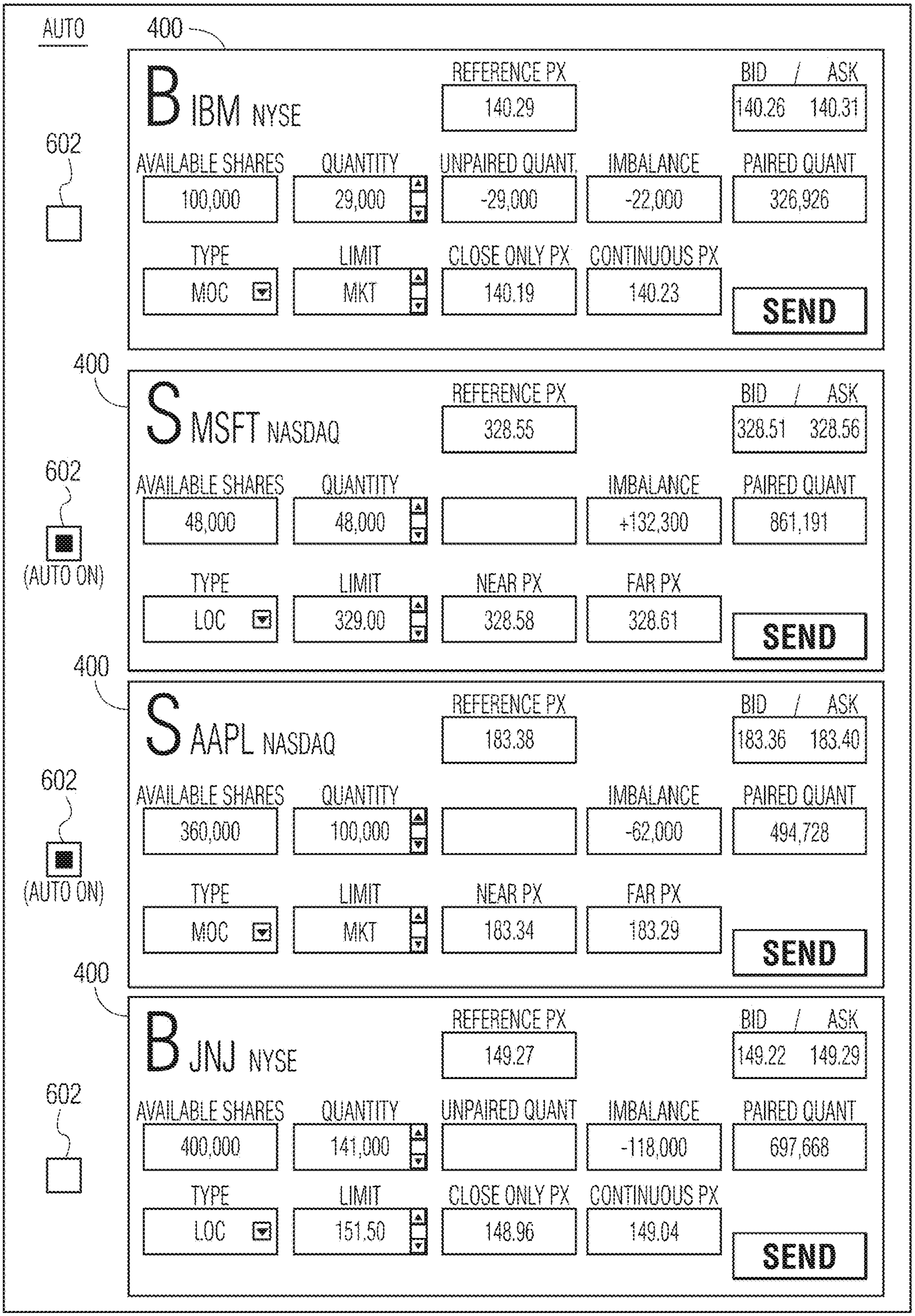
FIG. 6 is a diagram of an example of an interactive presentation with a user selection for automation, according to an aspect of the present disclosure.

Referring now to FIG. 6, a diagram of an example of the interactive presentation 222 with a user selection for automation is shown. The interactive presentation 222 may include one or more interactive order tickets 400 for one or more securities. The one or more interactive order tickets 400 may be sortable, for example, by side, alphabetically by symbol, or by both (e.g., first by side then alphabetically within side).

Each interactive order ticket 400 may have a selectable indicator 602, such as a check box, next to it that allows a user to select and visualize whether or not the automatic submission feature is activated or deactivated for that particular interactive order ticket 400. A user may interact with the selectable indicator 602 (e.g., "check" and "uncheck" the box) on the GUI, for each interactive order ticket 400 to turn the automatic submission feature on and off.

If the automatic submission feature is enabled, after a whole or partial match of the "available shares to trade" and imbalance data associated with the respective interactive order ticket 400 are detected, the gateway server 218 may automatically send an order to the respective exchange of the one or more exchanges 204 and allow the user to participate in an auction or cross. This may alleviate the burden of monitoring the auctions and crosses away, as well as the time needed to submit an order to the one or more exchanges 204 when selecting the send button 438 manually.

In an example, once the gateway server 218 detects a match for some or all of the available shares to trade for an interactive order ticket 400 that has been designated for automatic submission, it may fill in the quantity field with that respective match quantity, and use the rest of the data associated with the "available shares to trade" from the one or more data caches 224, such as "limit price," to update the interactive order ticket 400 in real-time. A user may change a default quantity of shares to send for execution (e.g., instead of 100% of the matched quantity, the user may select another percentage of the matched quantity) via one or more of a settings menu of the interactive presentation 222 and the interactive order ticket 400.

If a limit price is detected, the gateway server 218 may default to a LOC, LOO, or IO order type depending upon what the user selects as a default setting for automated orders. In an example, the default setting for all closing auction orders for a particular exchange of the one or more exchanges 204 may be "Closing D-Quote" order type which may either be a limit order (e.g., if a limit exists in the order data received from the one or more trading systems 206) or a market order (i.e., no limit). This may allow the gateway server 218 to interact with imbalance matches regardless of regulatory imbalances and time of day (e.g., up until 3:59:50 p.m. based on exchange rules).

In another example, users may also have the option of defaulting all orders for a particular exchange of the one or more exchanges 204 to MOO or MOC orders instead of LOO and LOC orders, and therefore limits associated with a given ticker may be overridden. Orders for a particular exchange of the one or more exchanges 204 placed by the system after a first time (e.g., 3:55 P.M. EST) based on rules of that particular exchange may revert to LOC orders up until a second time (e.g., 3:58 P.M. EST) regardless of the default order type and revert to IO orders after the second time regardless of the default order type. If an exchange of the one or more exchanges 204 stops accepting all orders or a specific order type at particular time, the gateway server 218 may adhere to the rules of that exchange.

If the gateway server 218 only detects a match for a partial amount of the "shares available to trade" for a particular interactive order ticket 400 and automatically sends an order to the exchange that creates a remaining balance of "available shares to trade," the gateway server 218 may wait until the next imbalance update from that particular exchange to determine if a new match is created with the remaining balance of "shares available to trade." If a new match is created, the gateway server 218 may automatically send another order to the exchange, and keep doing so (e.g., based on the imbalance data), until there are no "shares available to trade" left. At that point, the interactive order ticket 400 may turn another color (e.g., red) to indicate that there are no "available shares to trade" for that ticker. Similar to the manual process, the imbalance data displayed on the interactive order ticket 400 may continue to update even though there are no "available shares to trade" so that the user may monitor the progression of the auction or cross.

If a user chooses to send less than 100% of the matched quantity (e.g., 50% only) in, for example, a settings menu of the interactive presentation 222, the gateway server 218 may behave in the same fashion as above when there is only a partial match of the "available shares to trade." The gateway server 218 may wait for the next imbalance update before trying to send the next automated order. At that point, the gateway server 218 may send another order if the new imbalance update warrants/creates a match, based on the balance of the "available shares to trade." In another example, a user may choose a minimum matched quantity (based on a percentage of the available shares to trade) in the settings menu of the interactive presentation 222, before the gateway server 218 creates a match and sends an order to the exchange.

Orders submitted to an exchange of the one or more exchanges 204 via the automated process may create an open order display 500 as described above. In an example, a user may cancel an automated order up until respective exchange cut-off times, but automated orders may not be modified or edited. If a user cancels an open automated order prior to disabling the automated functionality, the gateway server 218 may continue to create automated orders for that ticker when matches occur, using the "quantity" from the cancelled order and/or, remaining "shares available to trade." As described above, if a number of open order displays 500 exceeds a maximum available space dedicated to open order displays 500 for a given symbol, a scroll bar may appear within the dedicated space beneath the open order displays 500 for that symbol.

Unlike conventional trading systems, the imbalance DID system 202 may match open equity orders from a user's OMS, EMS, and/or trading blotter with liquidity stemming directly from auctions/crosses via imbalance data that is disseminated by the one or more exchanges 204 at predetermined times and intervals. Further, the imbalance DID system 202 may be able to match and execute orders without any sort of "negotiation" stage.

Unlike conventional trading systems that require buyers and sellers to be using the same trading system (e.g., a "closed" system), the imbalance DID system 202 uses imbalance data disseminated by the one or more exchanges 204 and may match buyers and sellers regardless of which particular trading system the buyers and sellers use. Furthermore, the imbalance data may include orders that have been comingled. Orders from buyers and sellers from all trading systems may be netted out by the exchange to what amounts to an imbalance of shares to buy or sell for a particular equity security. All of the comingled buyers and sellers may receive the same and final execution price from the results of the auction/cross.

Conventional matching systems do not present potential liquidity to execute against that has been netted out first by an exchange. The order flow in conventional systems is not "paired off," "netted," or combined with other orders on the opposite side before being presented to the user as a "match" or "contra side." In other systems, buy orders for a security may be kept separate or segregated from sell orders in the same security before either is presented to the user. In contrast, in the present system, the one or more exchanges 204 may go through a netting process of the buy and sell orders first. For example, for a ticker with symbol XYX at an indicative/reference price of $16.88, the netting processing may result in a net imbalance that may be represented by the following equation:

68,000 shares to buy+40,000 shares to sell=28,000 shares to buy net imbalance     Equation 1

Another aspect that distinguishes the imbalance DID system 202 from conventional trading systems is that there may be no agreed upon price before execution of an order takes place. Unlike in conventional systems where a user may know what price the trade will execute at before they commit to the trade, the user of the imbalance DID system 202 may not be aware of the execution price before committing to the trade. The final price of the exchange's auction or cross may determine the execution price the user in this system receives.

Unlike conventional trading systems, there is no confidential information from a second party received by the imbalance DID system 202, there are no requests, invitations, or advertisements, and there are no indications of interest or notifications of an individual order sent to a second party. The imbalance DID system 202 does not identify a contra-party to negotiate with as it only matches imbalance order flow stemming from the auctions/crosses that occur on the one or more stock exchanges 204 and no negotiations take place prior to a final execution/fill price.

The one or more exchanges 204, which may represent the "other side" or "match" in the imbalance DID system 202, may never receive any information about the user's order flow, a potential match, or even the existence of the user, until, and unless, the user decides to send an order to the exchange after receiving a potential match with the order imbalance information disseminated by the exchange. In contrast, conventional systems may alert the users on both sides of a potential match (when one occurs) to the existence of one another, as soon as the potential match occurs. Regardless of whether or not a trade takes place after, users are alerted to each other and there is information leakage. In the imbalance DID system 202, there is no information leakage after a match is presented because the order imbalance information is public information.

Some portions of the present disclosure describe embodiments in terms of algorithms and/or routines and symbolic representations of operations on information. These algorithmic descriptions and representations are used to convey the substance of this disclosure effectively to others skilled in the art. These operations, while described functionally, computationally, or logically, are to be understood as being implemented by data structures, computer programs or equivalent electrical circuits, field programmable gate arrays (FPGAs), microcode, or the like. Furthermore, at times, it may be convenient to refer to these arrangements of operations as routines or algorithms. The described operations and their routines/algorithms may be embodied in specialized software, firmware, specially-configured hardware or any combinations thereof.

The methods described herein may be performed by processing logic that may comprise hardware (e.g., circuitry, dedicated logic, programmable logic, microcode, etc.), software (such as instructions run on a processing device), or a combination thereof. In one embodiment, the methods described herein may be performed by one or more specialized processing components.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 7:
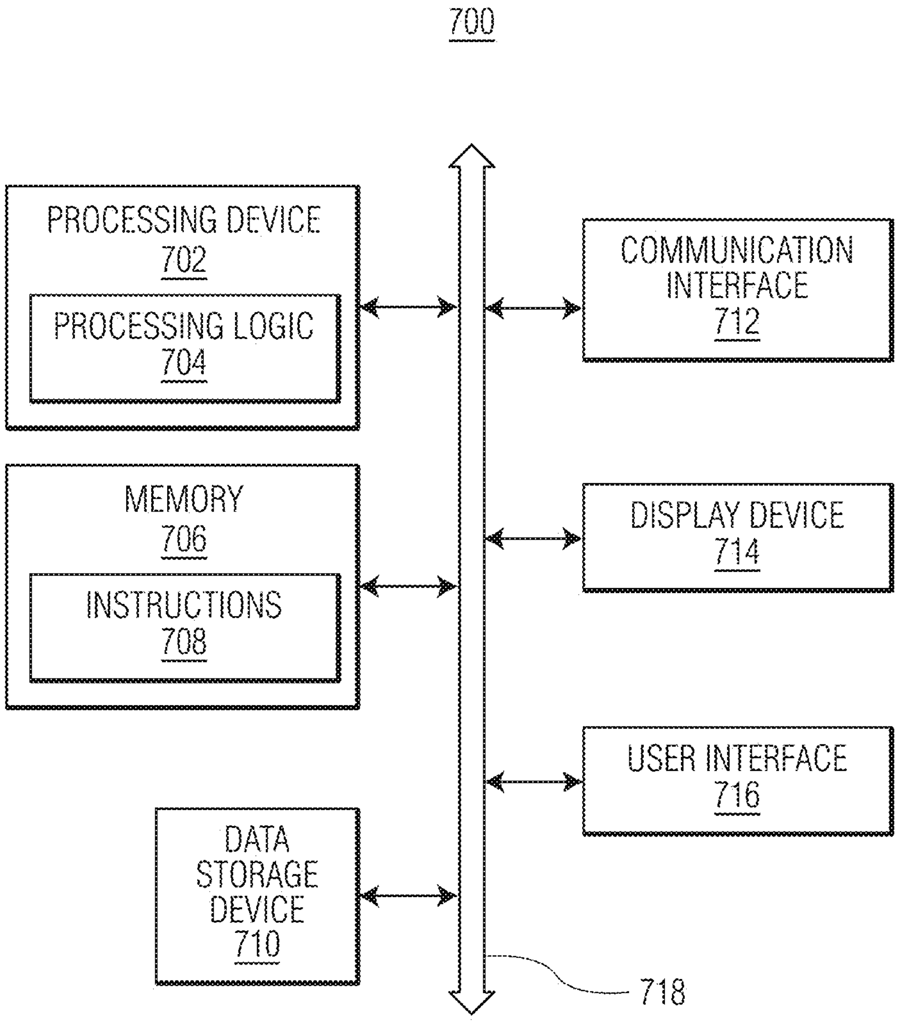
FIG. 7 is a functional block diagram of an example computer system, according to an aspect of the present disclosure.

Referring now to FIG. 7, a functional block diagram of a machine in the example of computer system 700 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more of components may be implemented by a specialized machine, particularly programmed to perform certain functions, such as the example machine shown in FIG. 7 (or a combination of two or more of such machines).

The example computer system 700 may include processing device 702, memory 706, data storage device 710 and communication interface 712, which may communicate with each other via data and control bus 718. In some examples, computer system 700 may also include display device 714 and/or user interface 716.

Display device 714 may be any known display technology, including but not limited to display devices using Liquid Crystal Display (LCD) or Light Emitting Diode (LED) technology.

The processing device 702 may use any known processor technology, including but not limited to graphics processors and multi-core processors. The processing device 702 may include, without being limited to, a microprocessor, a central processing unit, an application-specific integrated circuit (ASIC), a field programmable gate array (FPGA), a digital signal processor (DSP) and/or a network processor. The processing device 702 may be configured to execute processing logic 704 for performing the operations described herein. The processing device 702 may include a special-purpose processing device specially programmed with processing logic 704 to perform the operations described herein.

The memory 706 may include, for example, without being limited to, at least one of a read-only memory (ROM), a random access memory (RAM), a flash memory, a dynamic RAM (DRAM), phase change memory (PCM), and a static RAM (SRAM), storing computer-readable instructions 708 executable by processing device 702. The memory 706 may include a non-transitory computer readable storage medium storing computer-readable instructions 708 executable by processing device 702 for performing the operations described herein. Although one memory 706 is illustrated in FIG. 7, in some examples, computer system 700 may include two or more memory devices (e.g., dynamic memory and static memory).

The user interface 716 may be any known input device technology, including but not limited to a keyboard (including a virtual keyboard), mouse, track ball, microphone, brain implanted chip, wearable device, camera, and touch-sensitive pad or display.

The data and control bus 718 may be any known internal or external bus technology, including but not limited to industry standard architecture (ISA), extended ISA (EISA), peripheral component interconnect (PCI), PCI Express, universal serial bus (USB), Serial advanced technology attachment (ATA) or FireWire.

The computer system 700 may include communication interface 712, for direct communication with other computers (including wired and/or wireless communication) and/or for communication with a network. In some examples, computer system 700 may include display device 714 (e.g., a liquid crystal display (LCD), a touch sensitive display, etc.).

In some examples, the computer system 700 may include data storage device 710 storing instructions (e.g., software) for performing any one or more of the functions described herein. Data storage device 710 may include a non-transitory computer-readable storage medium, including, without being limited to, solid-state memories, optical media and magnetic media.

One or more features or steps of the disclosed embodiments may be implemented using an application programming interface (API). An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

The methods described herein, including those with reference to one or more flowcharts, may be performed by a controller and/or processing device (e.g., smartphone, computer, etc.). The methods may include one or more operations, functions, or actions as illustrated in one or more of blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation. Dashed lines may represent optional and/or alternative steps.

Additional examples of the presently described method and device embodiments are suggested according to the structures and techniques described herein. Other non-limiting examples may be configured to operate separately or may be combined in any permutation or combination with any one or more of the other examples provided above or throughout the present disclosure. Components and/or arrangement of components illustrated in one figure may be incorporated into any other figure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

It will be appreciated by those skilled in the art that the present disclosure may be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The terms "including" and "comprising" should be interpreted as meaning "including, but not limited to." If not already set forth explicitly in the claims, the term "a" should be interpreted as "at least one" and the terms "the, said, etc." should be interpreted as "the at least one, said at least one, etc."

The present disclosure is described with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may be executed substantially concurrently or the blocks may sometimes be executed in the reverse order, depending upon the functionality/acts involved.

For the purposes of this disclosure a non-transitory computer readable medium (or computer-readable storage medium/media) stores computer data, which data may include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, PCM, flash memory or other solid state memory technology, CD-ROM, DVD, or other optical storage, cloud storage, magnetic cassettes, magnetic tape, magnetic disk storage or other magnetic storage devices, or any other physical or material medium which may be used to tangibly store the desired information or data or instructions and which may be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

It is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:

receiving, by a data interface of an imbalance data integration and distribution ("DID") system comprising a processor operatively coupled to a memory storing computer-readable instructions, order data associated with a plurality of orders for a plurality of equity securities from one or more trading systems via a network;

receiving, by the data interface, real-time imbalance data and real-time market data distributed by one or more ticker plants associated with one or more national securities exchanges, the real-time imbalance data associated with one or more of an auction and a cross;

extracting, by the data interface, imbalance data associated with the plurality of equity securities from the real-time imbalance data and market data associated with the plurality of equity securities from the real-time market data;

storing, by the data interface, the order data and the imbalance data in one or more data caches;

retrieving, by a gateway server of the imbalance DID system, the order data and the imbalance data from the one or more data caches;

continuously comparing, by the gateway server, the order data and the portion of the imbalance data;

generating, by an interactive graphical user interface ("GUI") of the imbalance DID system, an interactive presentation comprising one or more interactive order tickets corresponding to one or more orders of the plurality of orders, each interactive order ticket of the one or more interactive order tickets comprising a plurality of fields configured to display the order data, the market data, and the imbalance data associated with an order of the one or more orders within a window;

displaying, by the interactive GUI, the interactive presentation on one or more user devices;

updating, by the interactive GUI, the plurality of fields of the one or more interactive order tickets based on real-time updates to one or more of the order data, the market data, and the imbalance, wherein the updating comprises a predetermined delay for one or more fields of the plurality of fields to prevent a change in value of the one or more fields before a user can provide user input;

receiving, by the interactive GUI, the user input to the interactive presentation comprising an instruction to submit an interactive order ticket of the one or more interactive order tickets as an order; and sending, by the gateway server, computer-readable instructions to an exchange of the one or more exchanges, that, when executed by the exchange, cause the exchange to execute the order in the one or more of the auction and the cross.

2. The method of claim 1, wherein the one or more trading systems comprises one or more of an order management system ("OMS"), an execution management system ("EMS"), and a trading blotter.

3. The method of claim 1, wherein the real-time imbalance data is disseminated by the one or more exchanges at predetermined times.

4. The method of claim 1, wherein the plurality of orders for the plurality of equity securities comprise open equity buy and sell orders.

5. The method of claim 1, wherein the one or more orders are paired with the imbalance data associated with the one or more equity securities based on, at least, a symbol of the one or more equity securities.

6. The method of claim 1, wherein the updating further comprises:

generating one or more of a visual and an audible alert indicating a status of a match between the order data associated with the one or more orders and the imbalance data associated with the one or more equity securities, the match comprising a determination by the gateway server that an open order of the one or more orders is on an opposite side of the imbalance data associated with the one or more equity securities and a quantity of the open order can be at least partially satisfied by a net imbalance of the imbalance data associated with the one or more equity securities.

7. The method of claim 6, wherein the one or more of a visual and an audible alert is associated with the interactive order ticket.

8. The method of claim 1, wherein the plurality of orders for the plurality of equity securities comprise open equity buy and sell orders.

9. The method of claim 1, wherein the plurality of orders for the one or more equity securities comprise a match between the order data associated with the one or more orders and the imbalance data associated with the one or more equity securities, the match comprising a determination by the gateway server that an open order of the one or more orders is on an opposite side of the imbalance data associated with the one or more equity securities and a quantity of the open order can be at least partially satisfied by a net imbalance of the imbalance data associated with the one or more equity securities.

10. The method of claim 9, wherein the updating comprises one or more of:

displaying the real-time updates associated with the match in one or more fields of the plurality of fields; and generating one or more of a visual and an audible alert indicating a status of the match.

11. The method of claim 10, wherein the one or more of a visual and an audible alert is associated with the interactive order ticket.

12. The method of claim 9, wherein the plurality of orders for the plurality of equity securities comprise open equity buy and sell orders.

13. The method of claim 1, wherein the one or more interactive order tickets are configured to be sorted by one or more of side and symbol.

14. The method of claim 1, further comprising:

receiving an additional user input to the interactive presentation to change one or more of the plurality of fields, the additional user input comprising one or more of entering values and selecting an adjustment via numeric controls.

15. The method of claim 1, wherein the user input comprises one or more of:

a selection of a submit button in the interactive order ticket; and a selection of an automatic submission setting in the interactive presentation.

16. The method of claim 15, wherein the automatic submission setting is configured to submit the interactive order ticket immediately upon a match, the match comprising a determination by the gateway server that an open order associated with the interactive order ticket is on an opposite side of the imbalance data associated with the one or more equity securities and a quantity of the open order can be at least partially satisfied by a net imbalance of the imbalance data associated with the one or more equity securities.

17. The method of claim 15, wherein the interactive presentation further comprises:

a selectable indicator to activate and deactivate the automatic submission setting for each of the one or more interactive order tickets displayed next to the respective each one or more interactive order tickets.

18. The method of claim 1, further comprising:

sending, by the data interface, an update to the one or more trading systems to reflect details of the order sent to the exchange.

19. The method of claim 1, further comprising:

generating, by the interactive GUI, an open order display configured to display one or more details of the order sent to the exchange and comprising one or more of an edit button that, when selected by the user, allows the user to edit the order and a cancel button that, when selected by the user cancels the order.

20. The method of claim 19, further comprising:

displaying, by the interactive GUI, the open order display as one of a plurality of open order displays, wherein the plurality of open order displays are grouped by symbol and are configured to be moved within a dedicated space of the interactive GUI by a scroll bar selectable by the user.

21. The method of claim 1, further comprising:

receiving, by the gateway server, a message from the exchange of the one or more exchanges containing details of the execution; and sending, by the data interface, an update to the one or more trading systems to reflect the details of the execution.

22. A system comprising:

a processing device operatively coupled to a memory storing computer-readable instructions that, when executed by the processing device, cause the processing device to:

receiving, by a data interface of an imbalance data integration and distribution ("DID") system comprising a processor operatively coupled to a memory storing computer-readable instructions, order data associated with a plurality of orders for a plurality of equity securities from one or more trading systems via a network;

receiving, by the data interface, real-time imbalance data and real-time market data distributed by one or more ticker plants associated with one or more national securities exchanges, the real-time imbalance data associated with one or more of an auction and a cross;

extracting, by the data interface, imbalance data associated with the order data from the real-time imbalance data and market data associated with the plurality of equity securities from the real-time market data;

storing, by the data interface, the order data and the imbalance data in one or more data caches;

retrieving, by a gateway server of the imbalance DID system, the order data and of the imbalance data from the one or more data caches;

continuously comparing, by the gateway server, the order data and the imbalance data;

generating, by an interactive graphical user interface ("GUI") of the imbalance DID system, an interactive presentation comprising one or more interactive order tickets corresponding to one or more orders of the plurality of orders, each interactive order ticket of the one or more interactive order tickets comprising a plurality of fields configured to display the order data, the market data, and the imbalance data associated with an order of the one or more orders within a window;

displaying, by the interactive GUI, the interactive presentation on one or more user devices;

updating, by the interactive GUI, the plurality of fields of the one or more interactive order tickets based on real-time updates to one or more of the order data, the market data, and the imbalance data, wherein the updating comprises a predetermined delay for one or more fields of the plurality of fields to prevent a change in value of the one or more fields before a user can provide user input;

receiving, by the interactive GUI, the user input to the interactive presentation comprising an instruction to submit an interactive order ticket of the one or more interactive order tickets as an order; and sending, by the gateway server, computer-readable instructions to an exchange of the one or more exchanges, that, when executed by the exchange, cause the exchange to execute the order in the one or more of the auction and the cross.

23. The system of claim 22, wherein the one or more trading systems comprises one or more of an order management system ("OMS"), an execution management system ("EMS"), and a trading blotter.

24. The system of claim 22, wherein the real-time imbalance data is disseminated by the one or more exchanges at predetermined times.

25. The system of claim 22, wherein the plurality of orders for the plurality of equity securities comprise open equity buy and sell orders.

26. The system of claim 22, wherein the one or more orders are paired with the imbalance data associated with the one or more equity securities based on, at least, a symbol of the one or more equity securities.

27. The system of claim 22, wherein the updating further comprises:

generating one or more of a visual and an audible alert indicating a status of a match between the order data associated with the one or more orders and the imbalance data associated with the one or more equity securities, the match comprising a determination by the gateway server that an open order of the one or more orders is on an opposite side of the imbalance data associated with the one or more equity securities and a quantity of the open order can be at least partially satisfied by a net imbalance of the imbalance data associated with the one or more equity securities.

28. The system of claim 27, wherein the one or more of a visual and an audible alert is associated with the interactive order ticket.

29. The system of claim 22, wherein the plurality of orders for the plurality of equity securities comprise open equity buy and sell orders.

30. The system of claim 22, wherein the plurality of orders for the one or more equity securities comprise a match between the order data associated with the one or more orders and the imbalance data associated with the one or more equity securities, the match comprising a determination by the gateway server that an open order of the one or more orders is on an opposite side of the imbalance data associated with the one or more equity securities and a quantity of the open order can be at least partially satisfied by a net imbalance of the imbalance data associated with the one or more equity securities.

31. The system of claim 30, wherein the updating comprises one or more of:

displaying the real-time updates associated with the match in one or more fields of the plurality of fields; and generating one or more of a visual and an audible alert indicating a status of the match.

32. The system of claim 31, wherein the one or more of a visual and an audible alert is associated with the interactive order ticket.

33. The system of claim 30, wherein the plurality of orders for the plurality of equity securities comprise open equity buy and sell orders.

34. The system of claim 22, wherein the one or more interactive order tickets are configured to be sorted by one or more of side and symbol.

35. The system of claim 22, wherein the computer-readable instructions, when executed by the processing device, further cause the processing device to:

receive an additional user input to the interactive presentation to change one or more of the plurality of fields, the additional user input comprising one or more of entering values and selecting an adjustment via numeric controls.

36. The system of claim 22, wherein the user input comprises one or more of:

a selection of a submit button in the interactive order ticket; and a selection of an automatic submission setting in the interactive presentation.

37. The system of claim 36, wherein the automatic submission setting is configured to submit the interactive order ticket immediately upon a match, the match comprising a determination by the gateway server that an open order associated with the interactive order ticket is on an opposite side of the imbalance data associated with the one or more equity securities and a quantity of the open order can be at least partially satisfied by a net imbalance of the imbalance data associated with the one or more equity securities.

38. The system of claim 36, wherein the interactive presentation further comprises:

a selectable indicator to activate and deactivate the automatic submission setting for each of the one or more interactive order tickets displayed next to the respective each one or more interactive order tickets.

39. The system of claim 22, wherein the computer-readable instructions, when executed by the processing device, further cause the processing device to:

send, by the data interface, an update to the one or more trading systems to reflect details of the order sent to the exchange.

40. The system of claim 22, wherein the computer-readable instructions, when executed by the processing device, further cause the processing device to:

generate, by the interactive GUI, an open order display configured to display one or more details of the order sent to the exchange and comprising one or more of an edit button that, when selected by the user, allows the user to edit the order and a cancel button that, when selected by the user cancels the order.

41. The system of claim 40, wherein the computer-readable instructions, when executed by the processing device, further cause the processing device to:

display, by the interactive GUI, the open order display as one of a plurality of open order displays, wherein the plurality of open order displays are grouped by symbol and are configured to be moved within a dedicated space of the interactive GUI by a scroll bar selectable by the user.

42. The system of claim 22, wherein the computer-readable instructions, when executed by the processing device, further cause the processing device to:

receive, by the gateway server, a message from the exchange of the one or more exchanges containing details of the execution; and send, by the data interface, an update to the one or more trading systems to reflect the details of the execution.

* * * * *